United States Patent [19]

Suyama et al.

[11] Patent Number: 5,298,564

[45] Date of Patent: Mar. 29, 1994

[54] COMPOSITION FOR CROSS-LINKING OF ETHYLENE-POLYMER, METHOD FOR CROSS-LINKING ETHYLENE-POLYMER, AND CROSS-LINKABLE COMPOSITION

[75] Inventors: Shuji Suyama; Hideyo Ishigaki, both of Aichi, Japan

[73] Assignee: Nippon Oil & Fats Co., Ltd., Tokyo, Japan

[21] Appl. No.: 53,342

[22] Filed: Apr. 28, 1993

Related U.S. Application Data

[62] Division of Ser. No. 684,876, Apr. 15, 1991, abandoned.

[30] Foreign Application Priority Data

Apr. 16, 1990 [JP] Japan .................... 2-97686
Aug. 16, 1990 [JP] Japan .................... 2-215008
Mar. 22, 1991 [JP] Japan .................... 3-81263

[51] Int. Cl.$^5$ .............................. C08F 8/00
[52] U.S. Cl. ..................... 525/263; 252/186.23; 252/186.26; 252/186.38; 252/186.42; 525/320; 525/333.8; 525/387
[58] Field of Search ............ 525/263, 320, 333.8, 525/387

[56] References Cited

U.S. PATENT DOCUMENTS

| | | |
|---|---|---|
| 3,202,648 | 8/1965 | Latourette et al. . |
| 3,335,124 | 8/1967 | Larsen . |
| 3,954,907 | 5/1976 | Schober . |
| 4,298,713 | 11/1981 | Morita et al. ............ 525/320 |
| 4,507,432 | 3/1985 | Banno et al. ............ 525/49 |

FOREIGN PATENT DOCUMENTS

| | | |
|---|---|---|
| 2535329 | 5/1984 | France . |
| 54-8500 | of 1979 | Japan . |
| 2-31106 | of 1990 | Japan . |

Primary Examiner—Bernard Lipman
Attorney, Agent, or Firm—Oblon, Spivak, McClelland, Maier & Neustadt

[57] ABSTRACT

A composition for cross-linking of ethylene.polymer comprises 2,4-diphenyl-4-methyl-1-pentene and at least one peroxide selected from the group consisting of [1] peroxides represented by the formula (I):

$$(R^1-\underset{\underset{CH_3}{|}}{\overset{\overset{CH_3}{|}}{C}}-OO-\underset{\underset{CH_3}{|}}{\overset{\overset{CH_3}{|}}{C}}-)_n R^2 \quad (I)$$

(wherein $R^1$ stands for one member selected from the group consisting of alkyl groups, aryl groups, and alkyl-substituted aryl groups having 1 to 9 carbon atoms, $R^2$ for one member selected from the group consisting of phenylene group, ethylene group, —C≡C—, and alkyl groups, aryl groups, and alkyl-substituted aryl groups having 1 to 9 carbon atoms, and n for 1 or 2) and [2] peroxides represented by the formula (II):

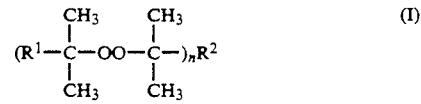

(wherein two $R^3$'s independently stand for one member selected from the group consisting of alkyl groups, aryl groups, and alkyl-substituted aryl groups of 1 to 9 carbon atoms or jointly stand for an ethylene group, $R^4$ and $R^5$ independently stand for a linear or branched alkyl group of 1 to 6 carbon atoms or —(CH$_2$)$_m$C(O)OR$^6$ [wherein $R^6$ stands for an alkyl group of 1 to 4 carbon atoms and m for an integer in the range of 1 to 3] or jointly for a cyclohexane ring or a cyclododecane ring unsubstituted or substituted with 1 to 3 alkyl groups of 1 to 4 carbon atoms); a method for cross-linking an ethylene.polymer by the use of the composition mentioned above, a method for cross-linking an ethylene.-polymer using the composition and a cross-linkable composition comprises an ethylene.polymer and the composition.

14 Claims, 5 Drawing Sheets

FIG.2

DCP FREEZING TEMPERATURE

FIG.3

DCP FREEZING TEMPERATURE

FIG. 4

DCP FREEZING TEMPERATURE

FIG. 5

DBC FREEZING TEMPERATURE

FIG.6

DBC FREEZING TEMPERATURE

FIG.7

DBC FREEZING TEMPERATURE

FIG.8

DCP,DBC FREEZING TEMPERATURE

COMPOSITION FOR CROSS-LINKING OF ETHYLENE-POLYMER, METHOD FOR CROSS-LINKING ETHYLENE-POLYMER, AND CROSS-LINKABLE COMPOSITION

This application is a division of application Ser. No. 07/684,876, filed on Apr. 15, 1991, now abandoned.

BACKGROUND OF THE INVENTION

1. Field of the Invention

This invention relates to a composition for cross-linking ethylene.polymer which enables an ethylene.-polymer to be cross-linked by heating while simultaneously retarding scorch and enhancing the degree of cross-linking, and to a method for cross-linking ethylene.polymer.

This invention further relates to a composition for the production of a cross-linked ethylene.polymer, which composition retains a liquid state at normal room temperature, exhibits only slight volatility, and exhibits high aging stability.

2. Description of the Prior Art

A well-known problem in the production of shaped articles of a cross-linked ethylene.polymer is that the compound suffers scorching in the molding device to such an extent that the appearance of the molded article is degraded, the amount of the compound extruded becomes irregular, and the products come to lack uniformity.

A number of methods are already known for preventing the compound from scorching in the molding device. For example, Japanese Patent Publication SHO 54(1979)-8500 discloses a method for preventing scorch by addition of a selected vinyl compound such as, for example, α-methylstyrene or an acrylic ester. U.S. Pat. No. 3,335,124 discloses a method for preventing scorch by addition of a sulfur compound. U.S. Pat. No. 3,202,648 discloses one based on the addition of a nitrogen compound, and Japanese Patent Publication SHO 47(1972)-36866 discloses one based on the addition of a phenol type compound.

Dicumylperoxide (hereinafter referred to as "DCP") is commonly used as a cross-linking agent for polyethylene. Since this compound has a melting point of 38° C. to 40° C. and is in a solid state at room temperature, it is liable to be contaminated with foreign matter during handling. This foreign matter can not be detected. Mixing of ethylene.polymer with the DCP is generally carried out using an extruder or the like. For the DCP to be supplied at a fixed speed, it has to be melted by heating. The use of DCP therefore adds to the number of process steps and requires measures for operational safety.

For the solution of this problem, it has been proposed to use for cross-linking an organic peroxide which is in a liquid state at room temperature. Japanese Patent Publication HEI 2(1990)-031106 discloses an organic peroxide mixture consisting of 25 to 10% by weight of bis(α-t-butylperoxyisopropyl)benzene and 75 to 90% by weight of isopropylcumyl-t-butylperoxy and Japanese Patent Public Disclosure SHO 54(1979)-132644 discloses a DCP substituted with an alkyl group.

Joint use of an organic peroxide and 2,4-diphenyl-4-methyl-1-pentene (hereinafter referred to as "MSD") in the curing of an unsaturated polyester resin has been disclosed (Reinforced Plastics, Vol. 29, No. 8, pp. 357 to 362), as has the joint use of an organic peroxide and MSD for the purpose of lowering the molecular weight of a polymer resulting from the polymerization of a vinyl monomer such as styrene (Japanese Patent Publication SHO 55(1980)-6895).

The method of Japanese Patent Publication SHO 54(1979)-8500 is effective for retarding scorching but has little or no effect toward enhancing the degree of cross-linking. α-methylstyrene and acrylic ester are low molecular weights and, therefore, are susceptible of volatilization. They are volatilized, therefore, while they are being mixed with the ethylene.polymer or while the composition produced by the mixing is being stored and are degraded in their ability to retard scorching and are apt to cause inconsistency in the quality of the cross-linked polymer.

The methods of U.S. Pat. No. 3,335,124, U.S. Pat. No. 3,202,648, and Japanese Patent Publication SHO 47(1972)-36866 are useful for retarding scorching. However, these methods have a disadvantage of slightly lowering the cross-linking degree. Further, the compounds used in these methods have toxicity.

As regards the organic peroxides which are in the liquid state at normal room temperature, it is preferable during winter to use an organic peroxide having a lower melting point than the organic peroxides disclosed in Japanese Patent Publication HEI 2(1990)-31106 and Japanese Patent Public Disclosure SHO 54(1979)-132644. Furthermore the organic peroxides which are liquid at room temperature and have a low vapor pressure are required. Further, it is required that such liquid peroxides don't suffer yellowing and lowering of active oxygen during storage.

The purpose of the using MSD during the curing of an unsaturated polyester is to delay the curing time and lower the temperature of generated heat. The heat generation temperature is governed by the polymerization conversion rate. It is evident, therefore, that MSD only functions to inhibit the polymerization. In the polymerization of styrene, for example, MSD is used as a chain transfer agent for the purpose of lowering the molecular weight.

SUMMARY OF THE INVENTION

The present inventors conducted a prolonged study on the problems of the prior art described above and consequently found a composition for cross-linking of ethylene.polymer, a method for cross-linking the ethylene.polymer, and a cross-linkable composition comprising the aforementioned cross-linking composition and an ethylene.polymer. This invention was completed as a result.

To be specific, this invention is directed to (a) a composition for cross-linking of ethylene polymer consisting essentially of 2,4-diphenyl-4-methyl-1-pentene and at least one organic peroxide selected from the group consisting of [1] peroxides represented by the formula (I):

(wherein $R^1$ stands for one member selected from the group consisting of alkyl groups, aryl groups, and alkyl-substituted aryl groups having 1 to 9 carbon atoms, $R^2$ for one member selected from the group consisting of phenylene group, ethylene group, —C≡C—, and alkyl groups, aryl groups, and alkyl-substituted aryl groups having 1 to 9 carbon atoms, and n for 1 or 2) and [2] peroxides represented by the formula (II):

(wherein the two $R^3$'s independently stand for one member selected from the group consisting of alkyl groups, aryl groups, and alkyl-substituted aryl groups of 1 to 9 carbon atoms or jointly stand for an ethylene group, $R^4$ and $R^5$ independently stand for a linear or branched alkyl group of 1 to 6 carbon atoms or —$(CH_2)_mC(O)OR^6$ {wherein $R^6$ stands for an alkyl group of 1 to 4 carbon atoms and m for an integer in the range of 1 to 3} or jointly for a cyclohexane ring or a cyclododecane ring unsubstituted or substituted with 1 to 3 alkyl groups of 1 to 4 carbon atoms), (b) a method for cross-linking an ethylene.polymer in the presence of at least one organic peroxide selected from the group consisting of the compounds represented by the formula (I) mentioned above and the compounds represented by the formula (II) mentioned above, which method comprises effecting the cross-linking in the presence of 2,4-diphenyl-4-methyl-1-pentene, and (c) a cross-linkable composition which comprises at least one peroxide selected from the group consisting of the compounds represented by the formulas (I) and (II) mentioned above, 2,4-dimethyl-4-methyl-1-pentene and an ethylene.polymer.

DETAILED DESCRIPTION OF THE PREFERRED EMBODIMENTS

Specifically, the compounds represented by the aforementioned formula (I) which are usable as the organic peroxide in this invention include dialkylperoxides such as dicumylperoxide, t-butylcumylperoxide, 2,5-bis(t-butylperoxy)-2,5-dimethylhexane, 2,5-bis(t-butylperoxy)2,5-dimethylhexyne-3, di-t-butylperoxide, isopropylcumyl-t-butylperoxide, and bis(α-t-butylperoxyisopropyl)benzene, for example. The compounds represented by the aforementioned formula (II) which are usable as the organic peroxide in this invention include peroxyketals such as 1,1-bis(t-butylperoxy)cyclohexane, 1,1-bis(t-butylperoxy)3,3,5-trimethylcyclohexane, n-butyl-4,4-bis(t-butylperoxy)valerate, ethyl-3,3-bis(t-butylperoxy)butylate, 2,2-bis(t-butylperoxy)butane, 1,1-bis(t-butylperoxy)cyclododecane and 3,3,6,6,9,9-hexamethyl-1,2,4,5-tetraoxycyclononane, for example.

The organic peroxides represented by the aforementioned formula (I) include those in which $R^1$ and $R^2$ in the formula are the same or different and the organic peroxide represented by the aforementioned formula (II) include those in which $R^4$ and $R^5$ in the formula are the same or different.

Among the organic peroxide enumerated above, DCP and bis(α-t-butylperoxyisopropyl)benzene prove to be particularly preferable on account of their high cross-linking efficiency and low volatility. Since these compounds are in a solid state at 25° C., however, they are difficult to handle. In the present invention, a composition having a high cross-linking efficiency, low volatility, and a freezing temperature of not more than 25° C. can be obtained by incorporating therewith MSD and isopropylcumyl-t-butylperoxide which is in a liquid state even at −10° C.

The compounds cited as organic peroxides above, except for DCP, bis(α-t-butylperoxyisopropyl)benzene and 3,3,6,6,9,9-hexamethyl-1,2,4,5-tetraoxycyclononane, are in a liquid state at −10° C.

The gravimetric mixing ratio of the organic peroxide and the MSD in the composition of the present invention is in the range of 1:0.02 to 1:2. If the mixing ratio of the MSD to the organic peroxide is less than 1:0.02, the effect toward improving the cross-linking degree and scorch retardation is not sufficient. If this ratio exceeds 1:2, there ensues the disadvantage that the cross-linking degree is insufficient. When this composition is mixed with an ethylene.polymer, the amounts of the organic peroxide and the MSD to be incorporated are desired to be in the ranges of 0.3 to 5 parts by weight and 0.1 to 3 parts by weight, respectively based on 100 parts by weight of the ethylene.polymer. If the amount of the organic peroxide is less than 0.3 part by weight, the improvement in the cross-linking degree is not sufficient. If this amount exceeds 5 parts by weight, the cross-linking degree is unduly high and the cross-linked ethylene.polymer becomes brittle. If the amount of the MSD is less than 0.1 part by weight, the produced cross-linked ethylene.polymer is deficient in terms of scorch retardation. If this amount exceeds 3 parts by weight, the degree of ethylene.polymer cross-linking is low.

The ethylene.polymers which are usable in this invention include polyethylene, ethylene/propylene copolymer (EPR), ethylene/butene copolymer, ethylene/pentene copolymer, ethylene/vinylacetate copolymer (EVA), ethylene/propylene/diene copolymer, (EPDM), ethylene/ethylacrylate copolymer (EEA), ethylene/glycidyl methacrylate copolymer (EGMA), ethylene/methylmethacrylate copolymer, ethylene/acrylonitrile copolymer, and chlorinated polyethylene. Among ethylene.polymers cited above, the improvement of the cross-linking degree is excellent particularly in polyethylene, EPR, and EVA.

The cross-linkable composition of this invention which has the aforementioned organic peroxide and MSD incorporated in an ethylene polymer can contain various commonly used additives.

The MSD which is used in this invention is generally produced by dimerizing α-methylstyrene in the presence of an acidic catalyst. The MSD produced by this method contains as by-products of reaction not more than 5% of 2,4-diphenyl-4-methyl-2-pentene and not more than 1% of 1,1,3-trimethyl-3-phenylindane. The inclusion of these by-products poses no problem because these compounds do not participate in the cross-linking reaction.

Further, in the cross-linking of an ethylene.polymer by the use of the composition of this invention, the reaction mixture may incorporate therein various additives such as, for example, antioxidant, pigment, stabilizer for UV light, filler, plasticizer, and coagent which are generally used in the cross-linking process. Specifically, phenol type compounds, phosphorus type compounds, and sulfur type compounds may be cited as examples of the antioxidant or the stabilizer for UV light.

The antioxidant inherently functions to inhibit the reaction of cross-linking. In spite of this fact, the composition of this invention can manifest its effect even in the presence of these additives.

The cross-linking temperature of the composition of this invention is generally in the range of from 110° C. to 220° C. It is preferred to obtain a suitable cross-linking time, this temperature is selected in the range of from 130° C. to 200° C.

The ethylene.polymers which have been cross-linked by the use of the composition of this invention can be used as conventional molding materials.

The cross-linkable composition of this invention already incorporating therein the organic peroxide, MSD and an ethylene.polymer can be safely transported and stored. Thus, the production of a cross-linked ethylene.polymer can be simplified.

In the case of a molding material, for example, the organic peroxide and the MSD are mixed with an ethylene.polymer in the mixing ratio mentioned above. For the resultant mixture to be used as a master batch, the proportion of the organic peroxide is desired to be not less than 5 parts by weight and not more than 50 parts by weight and that of the MSD to be not less than 3 parts by weight and not more than 50 parts by weight. When the master batch of this composition is used for the production of a shaped article of ethylene.polymer, the mixing ratio of the organic peroxide to the MSD in the raw material may be fixed as already described.

The cross-linkable composition of this invention has the following characteristic merits. It precludes the phenomenon of scorching during the process of cross-linking and enhances the final cross-linking degree of the cross-linked product as compared with the product crosslinked by an organic peroxide alone for cross-linking. The addition of the MSD to the organic peroxide which is in a solid state at 25° C. brings about an effect of lowering the freezing temperature of the composition and allowing production of a composition which is in a liquid state at or below room temperature, in addition to the effect described above. This composition possesses high stability against aging, low vapor pressure and low volatilizing speed. In the cross-linking by the use of the composition of this invention, the effects mentioned above are attained even in the presence of an antioxidant.

Now, the present invention will be described specifically below with reference to working examples and comparative experiments. The acronyms representing the organic peroxides and the additives used in the following examples and comparative experiments denote the following compounds:

DCP: Dicumylperoxide (purity 99%; produced by Nippon Oil & Fats Co., Ltd. and marketed as "Percumyl D")

BCP: t-Butylcumylperoxide (purity 92%; produced by Nippon Oil & Fats Co., Ltd. and marketed as "Perbutyl C")

DBC: Bis (α-t-butylperoxyisopropyl)benzene (m/p 65/35 and purity 99%, produced by Nippon Oil & Fats Co., Ltd. and marketed as "Perbutyl P")

IPC: Isopropylcumyl-t-butylperoxide (m/p 60/40 and purity 94%; produced by Nippon Oil & Fats Co., Ltd. and marketed as "Perbutyl IPC")

25B: 2,5-Bis(t-butylperoxy)2,5-dimethylhexane (purity 92%; produced by Nippon Oil & Fats Co., Ltd. and marketed as "Perhexa 25B")

25Y: 2,5-Bis(t-butylperoxy)2,5-dimethylhexyne-3 (purity 90%; produced by Nippon Oil & Fats Co., Ltd. and marketed as "Perhexyne 25B")

3M: 1,1-Bis(t-butylperoxy)3,3,5-trimethylcyclohexane (purity 92%, produced by Nippon Oil & Fats Co., Ltd. and marketed as "Perhexa 3M")

IPCC: Isopropylcumylcumylperoxide [synthesized by the condensation of isopropylcumyl alcohol (m/p 60/40) and cumene hydroperoxide at a molar ratio of 1/1 in the presence of a perchloric acid catalyst]

MSD: 2,4-Diphenyl-4-methyl-1-pentene (purity 95%; produced by Nippon Oil & Fats Co., Ltd. and marketed as "Nofmer MSD")

αMS: α-Methylstyrene

PEP36: A phosphorus type antioxidant (produced by Adeka Argas and marketed as "MARK PEP36")

TBP: 4,4'-Thiobis(3-methyl-6-t-butylphenol)

BHT: 2,6-Di-t-butyl-p-cresol

NDA: N-Nitrosodiphenylamine

MBT: 2-Mercaptobenzothiazole

Irganox: (produced by Nippon Ciba Geigy and marketed as "Irganox 1076")

TAIC: Triallyl isocyanurate

CB: Carbon black (produced by Mitsubishi Chemical Industries, Ltd. and marketed as "HAF")

EXAMPLE 1

Figure 1:
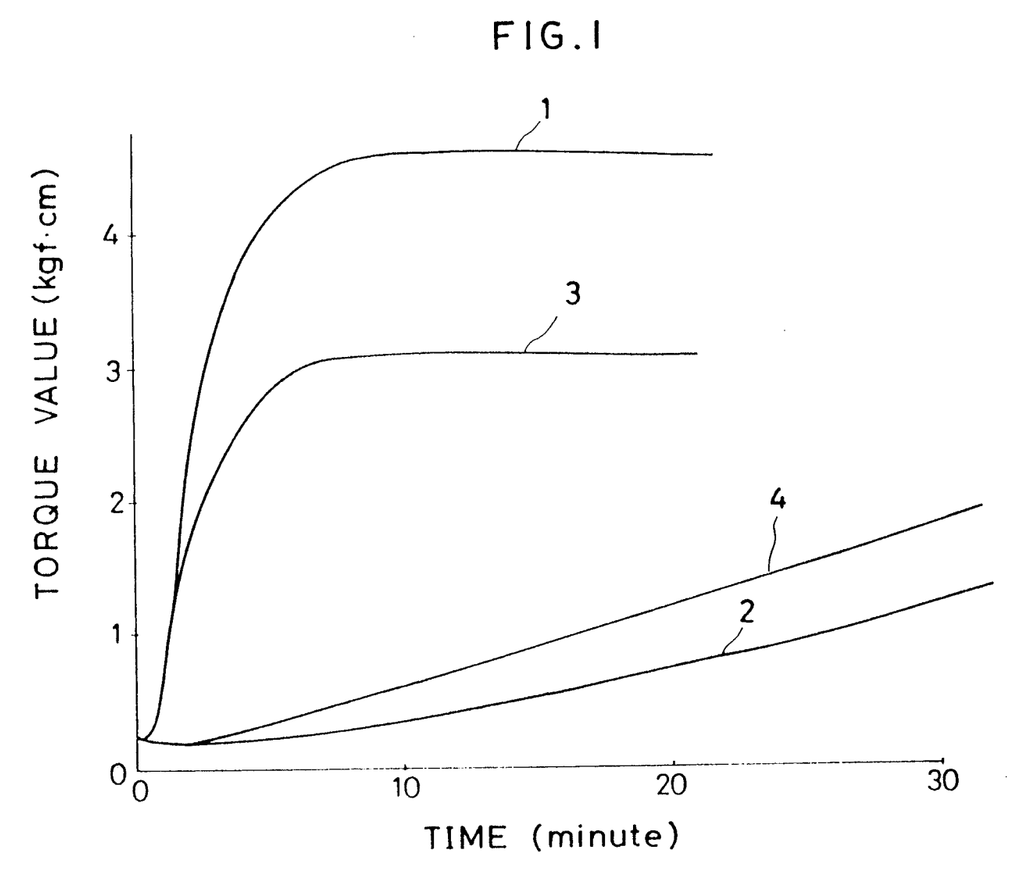
FIG. 1 is a diagram showing the results of the test with Curelastometer performed in Example 1 and Comparative Experiment 1.

A composition was obtained by mixing 500 g of low-density polyethylene (produced by Nippon Unicar K.K. and marketed as "NUC-9025") and 12.5 g of DCP and 5 g of MSD. This composition was kneaded with a hot roll at about 110° C. for about 20 minutes. The resultant blend was subjected to a heating test by the use of an instrument (produced by Toyo Boldwin K.K. and marketed as "JSR Curelastometer III"). The maximum torque was measured at 180° C. And, the sample was tested for scorch time at 145° C. The scorch time represented the time required for the torque to rise from the minimum level to 10% of the maximum level at 180° C. The results are shown in Tale 1. The relation between the magnitude of torque determined with the Curelastometer and the time is shown in FIG. 1. In FIG. 1, curve 1 represents the data obtained at 180° C. and curve 2 those obtained at 145° C.

COMPARATIVE EPERIMENT 1

The procedure of Example 1 was faithfully repeated, except that the use of MSD was omitted. The results are shown in Table 1. The relation between the magnitude of torque obtained with the Curelastometer and the time is shown in FIG. 1. In the diagram, curve 3 represent the data obtained at 180° C. and curve 4 those obtained at 145° C.

It will be noted from FIG. 1 that Example 1 registered high cross-linking speed and high cross-linking degree at the higher temperature of 180° C. and conversely low cross-linking speed at the lower temperature of 145° C., as compared with Comparative Experiment 1. This fact indicates that Example 1 delayed the scorch time and enhanced the cross-linking degree.

EXAMPLES 2 TO 22 AND COMPARATIVE EXPERIMENTS 2 TO 19

The procedure of Example 1 was repeated, except that the organic peroxide or the additives were changed to the compounds indicated in Table 1. The results are shown in Table 1.

TABLE 1

| Example No. | Peroxide (g) | | Additive A (g) | | Additive B (g) | | Scorch time 145° C. (minute) | Maximum torque 180° C. (kgf · cm) | Comparative Experiment No. |
|---|---|---|---|---|---|---|---|---|---|
| 1 | DCP | 12.5 | MSD | 5.0 | | | 17 | 4.60 | 1 |
| 2 | DCP | 12.5 | MSD | 10.0 | | | 16 | 3.17 | 2 |
| 3 | DCP | 12.5 | MSD | 2.5 | | | 14 | 4.23 | 3 |
| 4 | DCP | 12.5 | MSD | 1.25 | | | 9 | 3.43 | 4 |
| | | | | | | | | | 5 |
| | | | | | | | | | 6 |
| 5 | DCP | 10.0 | MSD | 5.0 | | | 16 | 3.15 | 7 |
| 6 | DCP | 7.5 | MSD | 5.0 | | | 16 | 1.80 | 8 |
| 7 | DCP | 12.5 | MSD | 2.5 | TBP | 1.0 | 17 | 3.63 | 9 |
| 8 | DCP IPC | 8.75 3.75 | MSD | 3.75 | | | 19 | 4.82 | 10 |
| 9 | DCP IPC | 8.75 3.75 | MSD | 3.75 | TBP | 1.0 | 18 | 3.90 | 11 |
| 10 | DBC | 8.0 | MSD | 5.0 | | | 34 | 4.05 | 12 |
| 11 | DBC | 8.0 | MSD | 2.4 | TBP | 1.0 | 38 | 4.01 | 13 |
| | | | | | | | | | 14 |
| 12 | BCP | 10.5 | MSD | 5.0 | | | 40 | 2.95 | 15 |
| 13 | 25B | 7.5 | MSD | 5.0 | | | 55 | 2.74 | 16 |
| 14 | 25Y | 7.5 | MSD | 5.0 | | | >60 | 4.50 | 17 |
| 15 | IPC | 11.5 | MSD | 5.0 | | | 30 | 3.00 | 18 |
| 16 | DCP | 12.5 | MSD | 5.0 | PEP36 | 3.0 | 20 | 4.30 | |
| 17 | DCP | 12.5 | MSD | 5.0 | Irganox | 1.5 | 20 | 4.45 | |
| 18 | DCP | 12.5 | MSD | 5.0 | TAIC | 2.5 | 14 | 5.05 | |
| 19 | DCP | 12.5 | MSD | 5.0 | CB | 100 | 22 | 4.03 | |
| 20 | IPC | 11.5 | MSD | 5.0 | TBP | 1.5 | 32 | 2.87 | |
| 21 | IPC | 11.5 | MSD | 5.0 | BHT | 1.5 | 35 | 2.56 | |
| 22 | DBC IPC | 2.0 8.0 | MSD | 5.0 | | | 18 | 2.99 | 19 |

| Example No. | Peroxide (g) | | Additive A (g) | | Additive B (g) | | Scorch time 145° C. (minute) | Maximum torque 180° C. (kgf · cm) |
|---|---|---|---|---|---|---|---|---|
| 1 | DCP | 12.5 | — | | | | 5 | 3.10 |
| 2 | IPCC | 13 | — | | | | 8 | 2.51 |
| 3 | DCP | 12.5 | BHT | 1.0 | | | 9 | 2.86 |
| 4 | DCP | 12.5 | NDA | 2.5 | | | 8 | 2.75 |
| | DCP | 12.5 | MBT | 2.5 | | | 8 | 2.63 |
| | DCP | 12.5 | αMS | 5.0 | | | 12 | 3.25 |
| 5 | DCP | 10.0 | — | | | | 6 | 2.45 |
| 6 | DCP | 7.5 | — | | | | 5 | 1.57 |
| 7 | DCP | 12.5 | — | | TBP | 1.0 | 10 | 2.78 |
| 8 | DCP IPC | 8.75 3.75 | — | | | | 6 | 2.52 |
| 9 | DCP IPC | 8.75 3.75 | — | | TBP | 1.0 | 25 | 2.51 |
| 10 | DBC | 8.0 | — | | | | 13.5 | 3.50 |
| 11 | DBC | 8.0 | — | | TBP | 1.0 | 27 | 3.70 |
| | DBC | 8.0 | αMS | 2.4 | TBP | 1.0 | 29 | 3.28 |
| 12 | BCP | 10.5 | — | | | | 10 | 2.40 |
| 13 | 25B | 7.5 | — | | | | 14 | 2.43 |
| 14 | 25Y | 7.5 | — | | | | 40 | 3.24 |
| 15 | IPC | 11.5 | — | | | | 10 | 1.80 |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | DBC | 2.0 | — | | | | 8 | 2.33 |

TABLE 1-continued

| | | |
|---|---|---|
| | IPC | 8.0 |

It will be noted from the results of Table 1 that the combined use of varying organic peroxides and MSD specified by this invention elongated scorch time and enhanced the maximum torque as compared with the experiment omitting the use of MSD (Examples 1 to 6, 10 and 12 to 15/Comparative Experiments 1, 7, 8, 12 and 15 to 18).

The known retardants were effective in elongating the scorch time but enhanced the maximum torque only slightly or rather lowered it (Comparative Experiments 3 to 6 and 14).

When the organic peroxide and the MSD were jointly used, the same effects as described above were obtained even in the presence of such additives as antioxidant (Examples 7, 9, 11, and 16 to 21).

The conventional liquid peroxides were inferior to the peroxides of this invention in terms of scorch time and maximum torque (Examples 1 and 22/Comparative Experiments 2 and 19).

EXAMPLES 23 TO 34

A composition was obtained by mixing 500 g of a high-density polyethylene (produced by Espolymer K.K. and marketed as "HDF6080V") with varying organic peroxides and additives indicated in Table 2. The compositions were severally kneaded by the use of a hot roll at about 130° C. for about 20 minutes. Then, they were tested by following the procedure of Example 1. The results are shown in Table 2.

COMPARATIVE EXPERIMENTS 20 TO 26

The procedures of Examples 23, 27 and 30 to 34 were repeated, except that the use of MSD was omitted. The results are shown in Table 2.

jected to a heating test by the use of the Curelastometer. The maximum torque at 145° C. was found to be 2.32 kgf.cm. The scorch time at 110° C. was 18 minutes.

COMPARATIVE EXPERIMENT 27

The procedure of Example 35 was repeated, except that the use of MSD was omitted. The maximum torque at 145° C. was 1.28 kgf.cm and the scorch time at 110° C. was 11 minutes.

COMPARATIVE EXPERIMENT 28

The procedure of Example 35 was repeated, except that 2.5 g of αMS was used in the place of MSD. The maximum torque at 145° C. was 1.55 kgf.cm. The scorch time at 110° C. was 15 minutes.

EXAMPLE 36

A composition was obtained by mixing 500 g of an ethylene/vinylacetate copolymer (vinyl acetate content 10% by weight; produced by Sumitomo Chemical Company, Ltd. and marketed as "Evatate D2021") with 12.5 g of DCP and 2.5 g of MSD. This composition was kneaded by the use of a hot roll at about 90° C. for about 20 minutes. It was then subjected to a heating test by the use of the Curelastometer. The maximum torque at 180° C. was 2.35 kgf.cm and the scorch time at 145° C. was 25 minutes.

COMPARATIVE EXPERIMENT 29

The procedure of Example 36 was repeated, except that the use of MSD was omitted. The maximum torque at 180° C. was 1.90 kgf.cm and the scorch time at 145° C. was 13 minutes.

TABLE 2

| Example No. | Peroxide (g) | | Additive A (g) | | Additive B (g) | Scorch time 145° C. (minute) | Maximum torque 180° C. (kgf · cm) | Comparative Experiment No. | Peroxide (g) | | Additive (g) | Scorch time 145° C. (minute) | Maximum torque 180° C. (kgf · cm) |
|---|---|---|---|---|---|---|---|---|---|---|---|---|---|
| 23 | DCP | 12.5 | MSD | 5.0 | | 12 | 6.30 | 20 | DCP | 12.5 | | 6 | 3.75 |
| 24 | DCP | 12.5 | MSD | 2.5 | | 8 | 6.77 | | | | | | |
| 25 | DCP | 12.5 | MSD | 7.5 | | 12 | 6.63 | | | | | | |
| 26 | DCP | 12.5 | MSD | 10.0 | | 11 | 6.27 | | | | | | |
| 27 | DCP | 12.5 | MSD | 2.5 | TBP 1.0 | 13 | 4.48 | 21 | DCP | 12.5 | TBP 1.0 | 9 | 3.22 |
| 28 | DCP | 10.0 | MSD | 5.0 | | 12 | 5.70 | | | | | | |
| 29 | DCP | 7.5 | MSD | 5.0 | | 14 | 3.64 | | | | | | |
| 30 | BCP | 10.5 | MSD | 5.0 | | 28 | 3.01 | 22 | BCP | 10.5 | | 10 | 2.72 |
| 31 | 25B | 7.5 | MSD | 5.0 | | 38 | 4.55 | 23 | 25B | 7.5 | | 15 | 2.88 |
| 32 | 25Y | 7.5 | MSD | 5.0 | | >60 | 4.33 | 24 | 25Y | 7.5 | | 50 | 3.00 |
| 33 | IPC | 11.5 | MSD | 5.0 | | 26 | 5.70 | 25 | IPC | 11.5 | | 11 | 2.25 |
| 34 | DCP IPC | 7.0 7.0 | MSD | 3.0 | TBP 1.0 | 15 | 4.65 | 26 | DCP IPC | 7.0 7.0 | TBP 1.0 | 8 | 3.01 |

Comparison of the results of Examples 23 to 34 with those of Comparative Experiment 20 to 26 reveals that even in high-density polyethylene, similarly to low-density polyethylene, the use of MSD elongated the scorch time and enhanced the maximum torque.

EXAMPLE 35

A composition was obtained by mixing 500 g of an ethylene/propylene copolymer (produced by Japan Synthetic Rubber Co., Ltd. and marketed as "JSR-EPO2P") with 12.5 g of 3M and 2.5 g of MSD. This composition was kneaded by the use of a hot roll at about 40° C. for about 20 minutes. Then, it was sub-

COMPARATIVE EXPERIMENT 30

The procedure of Example 36 was repeated, except that 2.5 g of n-octyl acrylate was used in the place of MSD. The maximum torque at 180° C. was 1.85 kgf.cm and the scorch time at 145° C. was 18 minutes.

EXAMPLES 37 TO 51

Compositions were obtained by mixing various organic peroxides with MSD as indicated in Table 3 at ratios indicated in the same table. These compositions were separately placed in test tubes 20 mm in inside diameter, stirred, and cooled at a temperature decreasing rate of 0.5° C. per minute. During the process of cooling, the temperatures at which the compositions start to crystallize (freezing temperature) were recorded. The results are shown in Table 3.

The compositions were left standing in a constant temperature bath at 30° C. for one month and then subjected to a color difference test by the use of an instrument (produced by Nippon Oenshoku Kogyo Co., Ltd. and marketed as "Color and Loior Difference Meter Z-1001-DP"). The results are shown in Table 3.

tion volatilized during this period were determined from the changes in weight. The results are shown in Table 3.

COMPARATIVE EXPERIMENTS 31 TO 44

Compositions were obtained that contained the various organic peroxides indicated in Table 3 individually or in pairs at ratios also indicated in the table. These compositions were subjected to the same test as in Example 37. The results are shown in Table 3.

TABLE 3

| Example No. | Peroxide (g) | | Additive (g) | | freezing temperature (°C.) | Amount of volatili- zation (%) | Color Difference (ΔE/cm) | | Comparative experiment No. |
|---|---|---|---|---|---|---|---|---|---|
| | | | | | | | Beginning | 30° C. one month | |
| 37 | DCP | 100 | MSD | 30 | 29 | 0.0 | 1.7 | 3.1 | 31 |
| 38 | DCP | 100 | MSD | 50 | 24 | 0.0 | 1.9 | 4.6 | 32 |
| | | | | | | | | | 33 |
| 39 | DCP | 70 | MSD | 30 | 13 | 0.5 | 3.1 | 4.8 | 34 |
| | IPC | 30 | | | | | | | |
| 40 | DCP | 85 | MSD | 15 | 20 | 0.3 | 2.7 | 4.0 | 35 |
| | IPC | 15 | | | | | | | |
| 41 | DCP | 50 | MSD | 30 | 2 | 0.4 | 2.7 | 4.5 | |
| | IPC | 50 | | | | | | | |
| 42 | DCP | 70 | MSD | 30 | 19 | 0.0 | 2.3 | 4.6 | 36 |
| | DBC | 30 | | | | | | | |
| 43 | DCP | 70 | MSD | 30 | 12.5 | 5.3 | 3.0 | 6.8 | 37 |
| | BCP | 30 | | | | | | | |
| 44 | DBC | 100 | MSD | 30 | 36.6 | 0.0 | 2.9 | 4.6 | 38 |
| 45 | DBC | 100 | MSD | 50 | 26.5 | 0.0 | 3.5 | 6.9 | |
| 46 | IPC | 100 | MSD | 30 | <−10 | 1.7 | 3.9 | 5.5 | 39 |
| 47 | BCP | 100 | MSD | 30 | <−10 | 8.8 | 3.0 | 6.2 | 40 |
| 48 | DBC | 70 | MSD | 30 | 26 | 0.5 | 4.1 | 5.3 | 41 |
| | IPC | 30 | | | | | | | |
| 49 | DBC | 70 | MSD | 30 | 24 | 3.3 | 2.8 | 7.5 | 42 |
| | BCP | 30 | | | | | | | |
| 50 | DCP | 70 | MSD | 30 | 17 | 1.0 | 3.9 | 7.0 | 43 |
| | 25B | 30 | | | | | | | |
| 51 | DBC | 70 | MSD | 30 | 28 | 0.8 | 4.8 | 6.3 | 44 |
| | 25B | 30 | | | | | | | |

| Example No. | Peroxide (g) | | Additive (g) | | freezing temperature (°C.) | Amount of Volatili- zation (%) | Color Difference (ΔE/cm) | |
|---|---|---|---|---|---|---|---|---|
| | | | | | | | Beginning | 30° C. one month |
| 37 | DCP | 100 | — | | 38.5 | 0.0 | 1.7 | 3.0 |
| 38 | DCP | 100 | αMS | 30 | 27 | 9.8 | 1.6 | 8.9 |
| | IPCC | 100 | | | 23 | 0.0 | 5.8 | 22.5 |
| 39 | DCP | 70 | — | | 25.5 | 0.6 | 3.0 | 16.6 |
| | IPC | 30 | | | | | | |
| 40 | DCP | 85 | — | | 32 | 0.3 | 3.5 | 9.2 |
| | IPC | 15 | | | | | | |
| 41 | | | | | | | | |
| 42 | DCP | 70 | — | | 30 | 0.0 | 3.8 | 12.9 |
| | DBC | 30 | | | | | | |
| 43 | DCP | 70 | — | | 21 | 4.9 | 3.6 | 18.7 |
| | BCP | 30 | | | | | | |
| 44 | DBC | 100 | — | | 50 | 0.0 | 3.3 | 7.2 |
| 45 | | | | | | | | |
| 46 | IPC | 100 | — | | <−10 | 2.1 | 3.8 | 15.9 |
| 47 | BCP | 100 | | | <−10 | 14.1 | 2.5 | 19.5 |
| 48 | DBC | 70 | | | 35 | 0.6 | 4.2 | 17.9 |
| | IPC | 30 | | | | | | |
| 49 | DBC | 70 | | | 33 | 4.5 | 4.5 | 20.3 |
| | BCP | 30 | | | | | | |
| 50 | DCP | 70 | | | 28 | 0.7 | 3.0 | 14.3 |
| | 25B | 30 | | | | | | |
| 51 | DBC | 70 | | | 38 | 1.5 | 4.3 | 10.5 |
| | 25B | 30 | | | | | | |

Compositions were obtained by mixing 20 g of each of the compositions described above with 1,000 g of low-density polyethylene pellets (produced by Nippon-Unicar K.K. and marketed as "NUC-9025"). The produced compositions were severally placed in bags made of polyethylene sheet 0.05 mm in thickness, sealed airtightly therein, and left standing at a temperature of about 15° C. for 30 days. The amounts of these composi- It will be noted from Table 3 that the compositions according with this invention showed lower freezing temperatures than the compositions omitting the addition of MSD. It is also clear that Examples 39 to 43 and 50 produced compositions for cross-linking which were in a liquid state at temperatures not exceeding 20° C.

It is further clear that the compositions of Examples 37 to 51 showed lower degrees of coloration after one month's standing at 30° C. than those of Comparative Experiments 31 to 44.

The amount of volatilization of the composition was smaller in Example 37 than in Comparative Experiment 32. It will be further noted that among the compositions of Examples 37 to 51, those of DCP, DBC, and IPC with MSD showed particularly small amounts of volatilization (Examples 37 to 42, 44 to 46, and 48).

EXAMPLE 52

Figure 2:
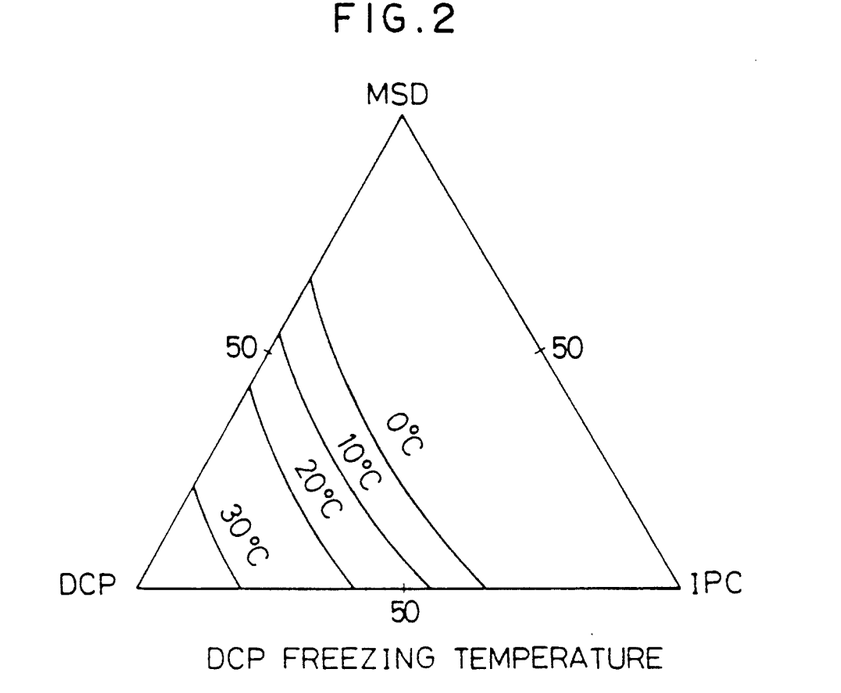
FIG. 2 is a diagram showing the DCP crystallizing temperature of a composition of DCP, MSD, and IPC indicated in Example 52.

A composition of DCP with IPC and MSD was tested for freezing temperature by following the procedure of Example 37. The results are shown in FIG. 2.

EXAMPLES 53 TO 58

Compositions of various organic peroxides indicated in Table 4 with MSD were tested for freezing temperature by following the procedure of Example 52. The results are shown in FIGS. 3 to 8.

TABLE 4

Figure 3:
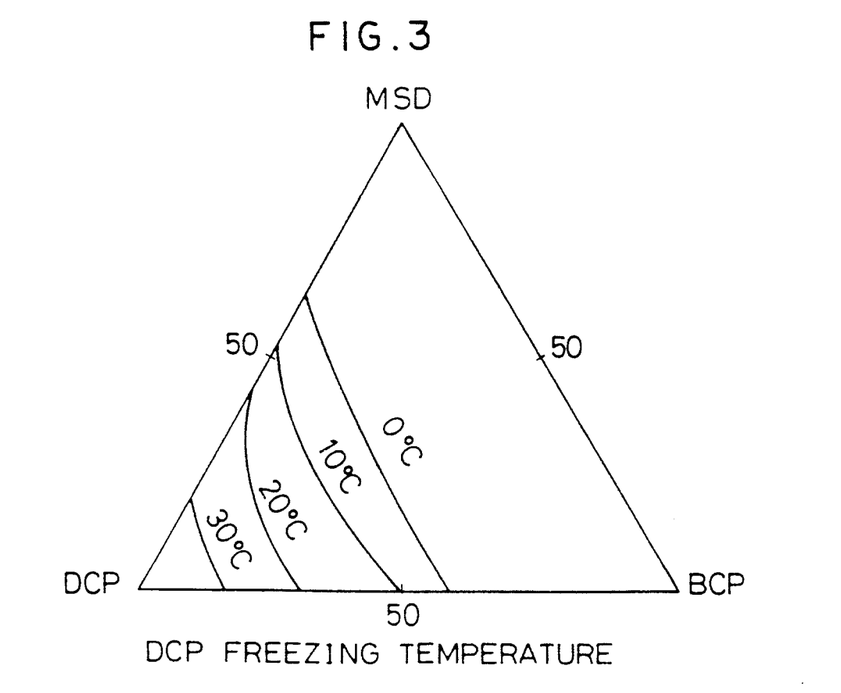
FIG. 3 is a diagram showing the DCP crystallizing temperature of a composition of DCP, MSD, and BCP indicated in Example 53.
Figure 4:
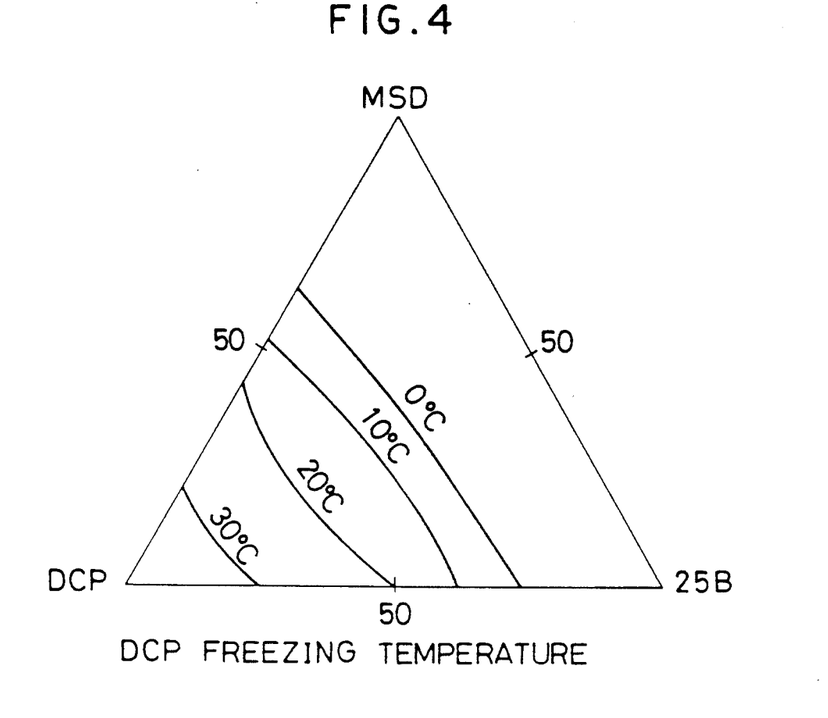
FIG. 4 is a diagram showing the DCP crystallizing temperature of a composition of DCP, MSD, and 25B indicated in Example 54.
Figure 5:
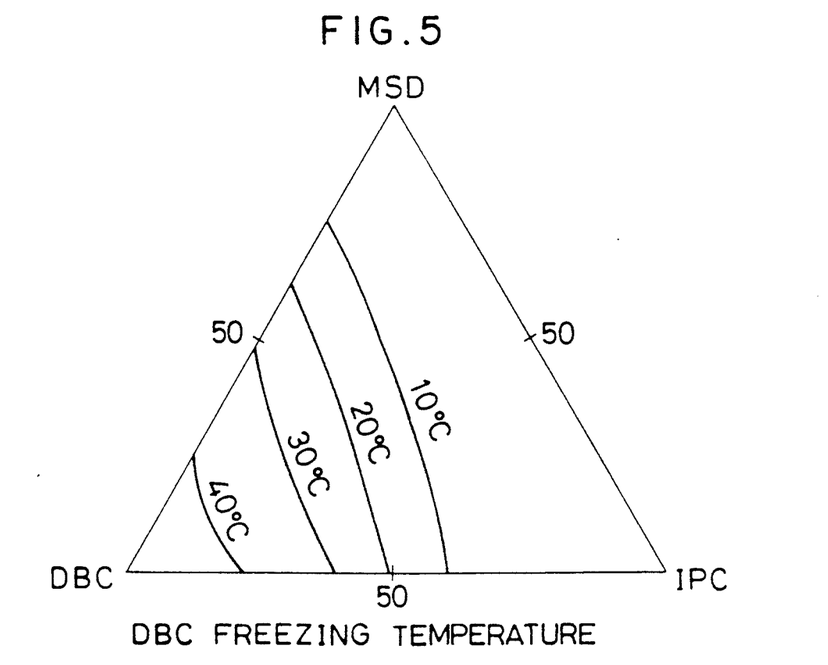
FIG. 5 is a diagram showing the DBC crystallizing temperature of a composition of DBC, MSD, and IPC indicated in Example 55.
Figure 6:
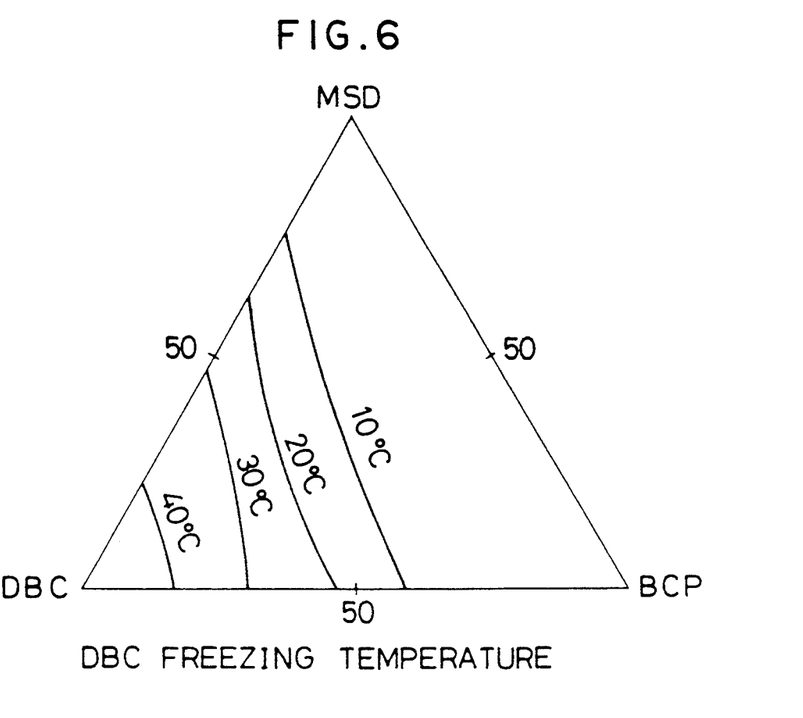
FIG. 6 is a diagram showing the DBC crystallizing temperature of a composition of DBC, MSD, and BCP indicated in Example 56.
Figure 7:
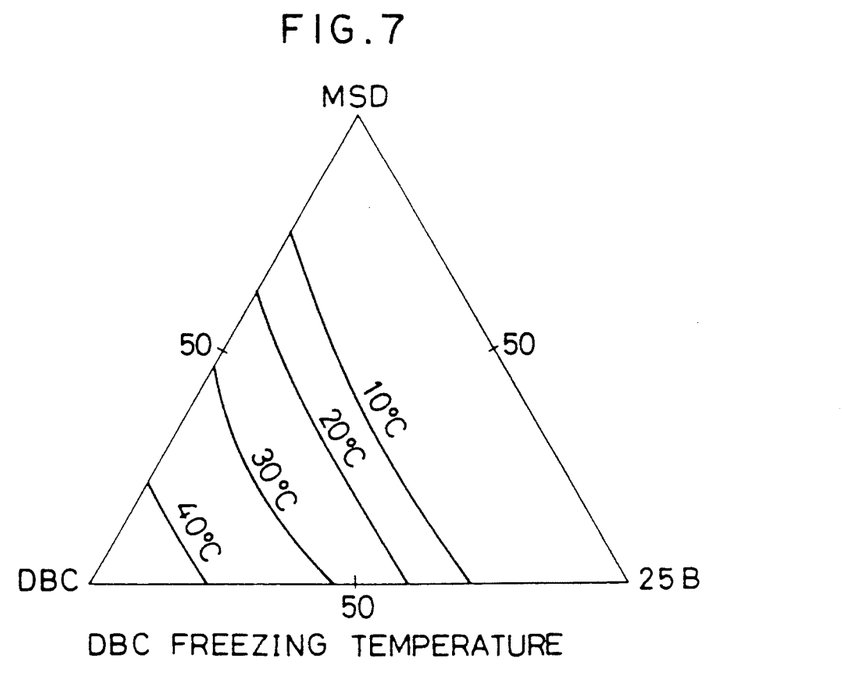
FIG. 7 is a diagram showing the DBC crystallizing temperature of a composition of DBC, MSD, and 25B indicated in Example 57.
Figure 8:
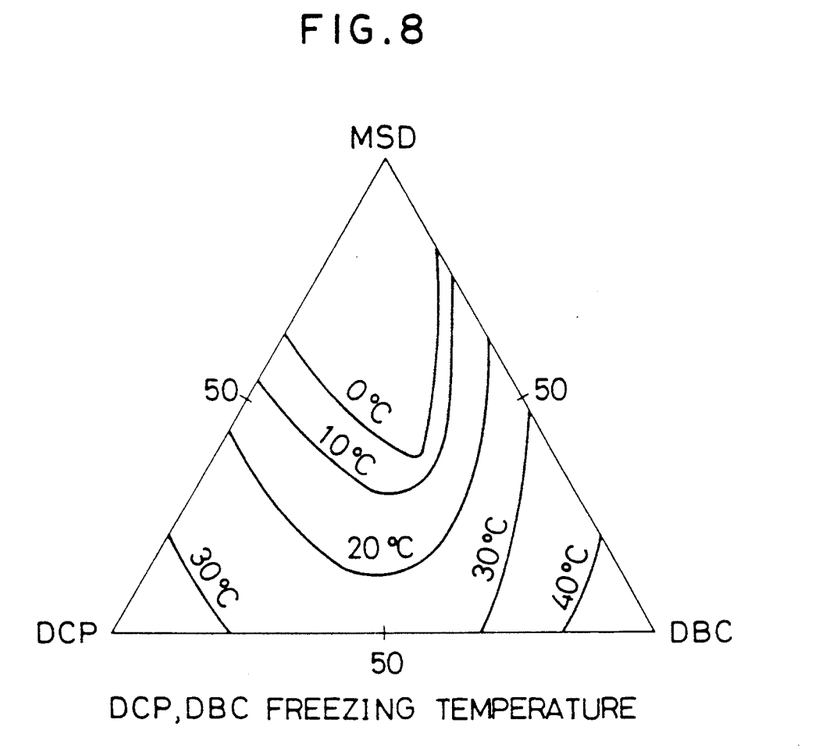
FIG. 8 is a diagram showing the DCP and DBC crystallizing temperature of a composition of DCP, MSD, and DBC indicated in Example 58.

| Example No. | Organic Peroxide | |
|---|---|---|
| 53 | DCP, BCP | FIG. 3 |
| 54 | DCP, 25B | FIG. 4 |
| 55 | DBC, IPC | FIG. 5 |
| 56 | DBC, BCP | FIG. 6 |
| 57 | DBC, 25B | FIG. 7 |
| 58 | DCP, DBC | FIG. 8 |

FIGS. 2 to 8 clearly show that the compositions of DCP and DBC with MSD which were in a solid state at 25° C. showed lower freezing temperatures and that the incorporation of other liquid organic peroxides contributed to lowering the freezing temperatures.

What is claimed is:

1. A method for cross-linking an ethylene-polymer in the presence of at least one organic peroxide selected from the group consisting of dicumylperoxide, t-butylcumylperoxide, 2,5-bis(t-butylperoxy)-2,5-dimethylhexane, 2,5-bis(t-butylperoxy)-2,5-dimethylhexyne-3, isopropylcumyl-t-butylperoxide, bis(α-t-butylperoxyisopropyl)benzene and peroxides represented by the formula (II):

wherein two $R^3$'s independently stand for one member selected from the group consisting of alkyl groups, aryl groups and alkyl-substituted aryl groups of 1 to 9 carbon atoms or jointly stand for an ethylene group, $R^4$ and $R^5$ independently stand for a linear or branched alkyl group of 1 to 6 carbon atoms or $-(CH_2)_mC(O)OR^6$, wherein $R^6$ represents an alkyl group of 1 to 4 carbon atoms and m represents an integer from 1 to 3 or jointly for an unsubstituted cyclohexane ring or an unsubstituted cyclododecane ring, wherein said method comprises carrying out said cross-linking in the presence of 2,4-diphenyl-4-methyl-1-pentene.

2. A cross-linkable composition comprising 2,4-diphenyl-4-methyl-1-pentene and an ethylene polymer and at least one organic peroxide selected from the group consisting of dicumylperoxide, t-butylcumylperoxide, 2,5-bis(t-butylperoxy)-2,5-dimethylhexane, 2,5-bis(t-butylperoxy)-2,5-dimethylhexyne-3, isopropylcumyl-t-butylperoxide, bis(α-t-butylperoxyisopropyl)benzene and peroxides represented by the formula (II):

wherein two $R^3$'s independently stand for one member selected from the group consisting of alkyl groups, aryl groups and alkyl-substituted aryl groups of 1 to 9 carbon atoms or jointly stand for an ethylene group, $R^4$ and $R^5$ independently stand for a linear or branched alkyl group of 1 to 6 carbon atoms or $-(CH_2)_mC(O)OR^6$, wherein $R^6$ represents an alkyl group of 1 to 4 carbon atoms and m represents an integer from 1 to 3 or jointly for an unsubstituted cyclohexane ring or an unsubstituted cyclododecane ring.

3. A method according to claim 1, wherein the weight ratio of said organic peroxide to said 2,4-diphenyl-4-methyl-1-pentene is in the range of 1:0.02 to 1:2.

4. A method according to claim 10, wherein said compound represented by the formula (II) is at least one member selected from the group consisting of 1,1-bis(t-butylperoxy)cyclohexane, n-butyl-4,4-bis(t-butylperoxy)valerate, ethyl-3,3- bis(t-butylperoxy)butylate, 2,2-bis(t-butylperoxy)butane, 1,1-bis(t-butylperoxy)cyclododecane and 3,3,6,6,9,9-hexamethyl-1,2,4,5-tetraoxycyclononane.

5. A method according to claim 1, wherein at least one of said organic peroxides is in a solid state at 25° C.

6. A method according to claim 5, wherein said organic peroxide contains dicumyl peroxide.

7. A method according to claim 5, wherein said organic peroxide contains bis(α-t-butylperoxyisopropyl)benzene.

8. A method according to claim 1, wherein said organic peroxide contains isopropylcumyl-t-butylperoxide.

9. A method according to claim 5, wherein said organic peroxide is a mixture of dicumylperoxide with isopropylcumyl-t-butylperoxide.

10. A cross-linkable composition according to claim 2, wherein the amount of said organic peroxide is in the range of from 0.3 to 50 parts by weight and that of said 2,4-diphenyl-4-methyl-1-pentene is in the range of from 0.1 to 50 parts by weight, based on 100 parts by weight of said ethylene.polymer.

11. A cross-linkable composition according to claim 2, wherein said ethylene.polymer is at least one member selected from the group consisting of polyethylene, ethylene/propylene copolymer, ethylene/butene copolymer, ethylene/pentene copolymer, ethylene/vinylacetate copolymer (EVA), ethylene/propylene/diene copolymer (EPDM), ethylene/ethylacrylate copolymer (EEA), ethylene/glycidylmethacrylate copolymer (EGMA), ethylene/methylmethacrylate copolymer, ethylene/acrylonitrile copolymer, and chlorinated polyethylene.

12. A cross-linkable composition according to claim 11, wherein said ethylene.polymer is polyethylene.

13. A cross-linkable composition according to claim 11, wherein said ethylene.polymer is an ethylene/propylene copolymer.

14. A cross-linkable composition according to claim 11, wherein said ethylene.polymer is ethylene/vinylacetate copolymer.

* * * * *